(12) United States Patent
Yoshikawa et al.

(10) Patent No.: US 9,991,541 B2
(45) Date of Patent: Jun. 5, 2018

(54) MICROBIAL FUEL CELL

(71) Applicant: Panasonic Corporation, Osaka (JP)

(72) Inventors: Naoki Yoshikawa, Osaka (JP); Yuuki Kitade, Osaka (JP); Hiroaki Usui, Osaka (JP)

(73) Assignee: Panasonic Corporation, Osaka (JP)

( * ) Notice: Subject to any disclaimer, the term of this patent is extended or adjusted under 35 U.S.C. 154(b) by 111 days.

(21) Appl. No.: 15/128,517

(22) PCT Filed: Jan. 30, 2015

(86) PCT No.: PCT/JP2015/000430
§ 371 (c)(1),
(2) Date: Sep. 23, 2016

(87) PCT Pub. No.: WO2015/145930
PCT Pub. Date: Oct. 1, 2015

(65) Prior Publication Data
US 2017/0110752 A1 Apr. 20, 2017

(30) Foreign Application Priority Data

Mar. 27, 2014 (JP) .................. 2014-066645

(51) Int. Cl.
*H01M 8/16* (2006.01)
*H01M 8/02* (2016.01)
*H01M 8/1004* (2016.01)
(52) U.S. Cl.
CPC .............. *H01M 8/16* (2013.01); *H01M 8/02* (2013.01); *H01M 8/1004* (2013.01)

(58) Field of Classification Search
CPC .................................. H01M 8/16; H01M 8/02
See application file for complete search history.

(56) References Cited

U.S. PATENT DOCUMENTS

| 2011/0256427 | A1 | 10/2011 | Fukase et al. |
| 2012/0003504 | A1 | 1/2012 | Yamazawa et al. |
| 2012/0276418 | A1 | 11/2012 | Zhou et al. |
| 2014/0024102 | A1 | 1/2014 | Sakai et al. |

FOREIGN PATENT DOCUMENTS

| JP | 2009-093861 A | 4/2009 |
| JP | 2010-033824 A | 2/2010 |
| JP | 2011-065875 A | 3/2011 |
| JP | 2012-99242 A | 5/2012 |

(Continued)

OTHER PUBLICATIONS

Extended European Search Report for corresponding European Application No. 15767753.5 dated Jan. 5, 2017.

(Continued)

*Primary Examiner* — Olatunji Godo
(74) *Attorney, Agent, or Firm* — Renner, Otto, Boisselle & Sklar, LLP

(57) ABSTRACT

A microbial fuel cell includes a container unit and an electrode unit. The container unit includes an electrolytic cell and a communication port. The electrode unit includes a gas-phase chamber, a positive electrode, a negative electrode that is configured to hold microbes, an ion transfer layer that is interposed between the positive electrode and the negative electrode, a first vent port, and a second vent port. The gas-phase chamber is communicated with the communication port through the second vent port.

3 Claims, 4 Drawing Sheets

(56) References Cited

FOREIGN PATENT DOCUMENTS

| JP | 2012-190787 A | 10/2012 |
|----|---------------|---------|
| JP | 2013-084597 A | 5/2013 |
| WO | WO 2008/059331 A2 | 5/2008 |
| WO | WO 2010/044145 A1 | 4/2010 |
| WO | WO 2012/056316 A1 | 5/2012 |

OTHER PUBLICATIONS

International Search Report for corresponding International Application No. PCT/JP2015/000430 dated Apr. 21, 2015.
Form PCT/ISA/237 for corresponding International Application No. PCT/JP2015/000430 dated Apr. 21, 2015.

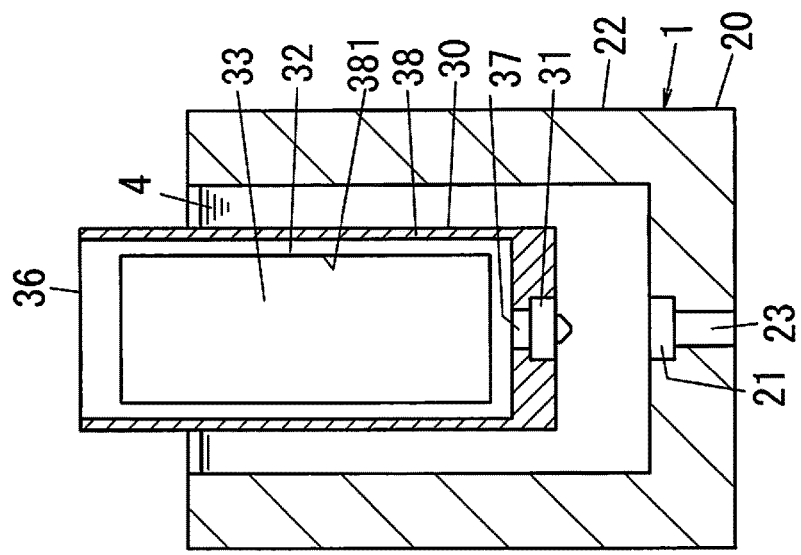
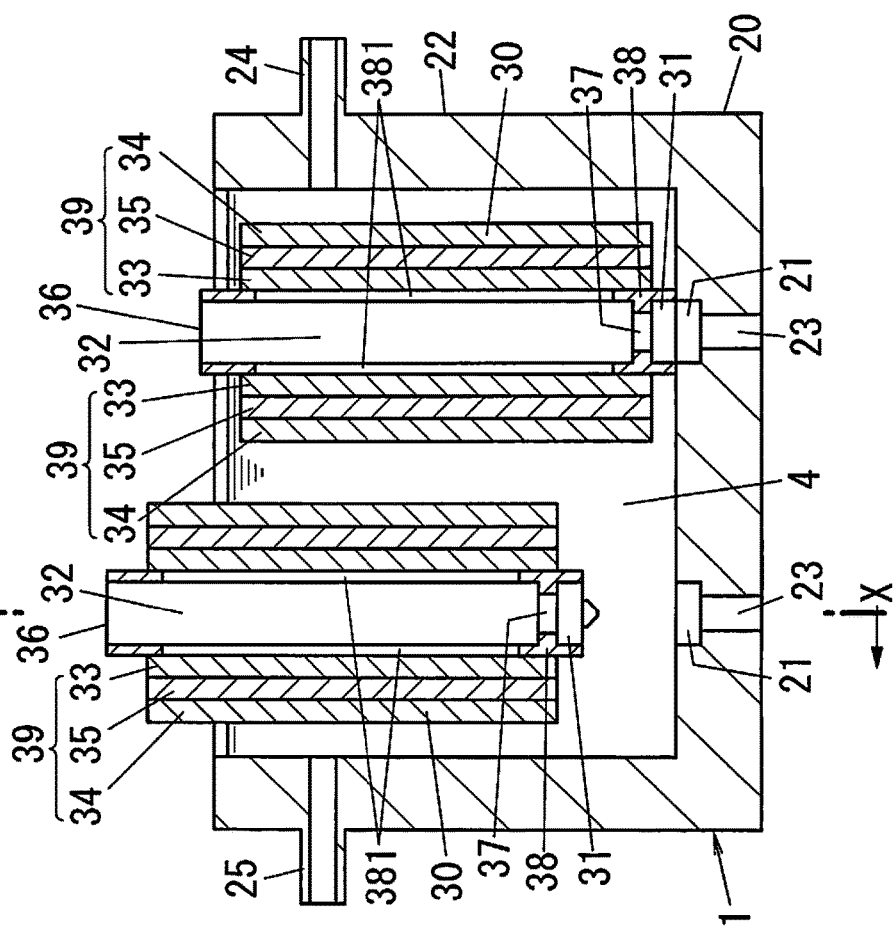
FIG. 1A
FIG. 1B

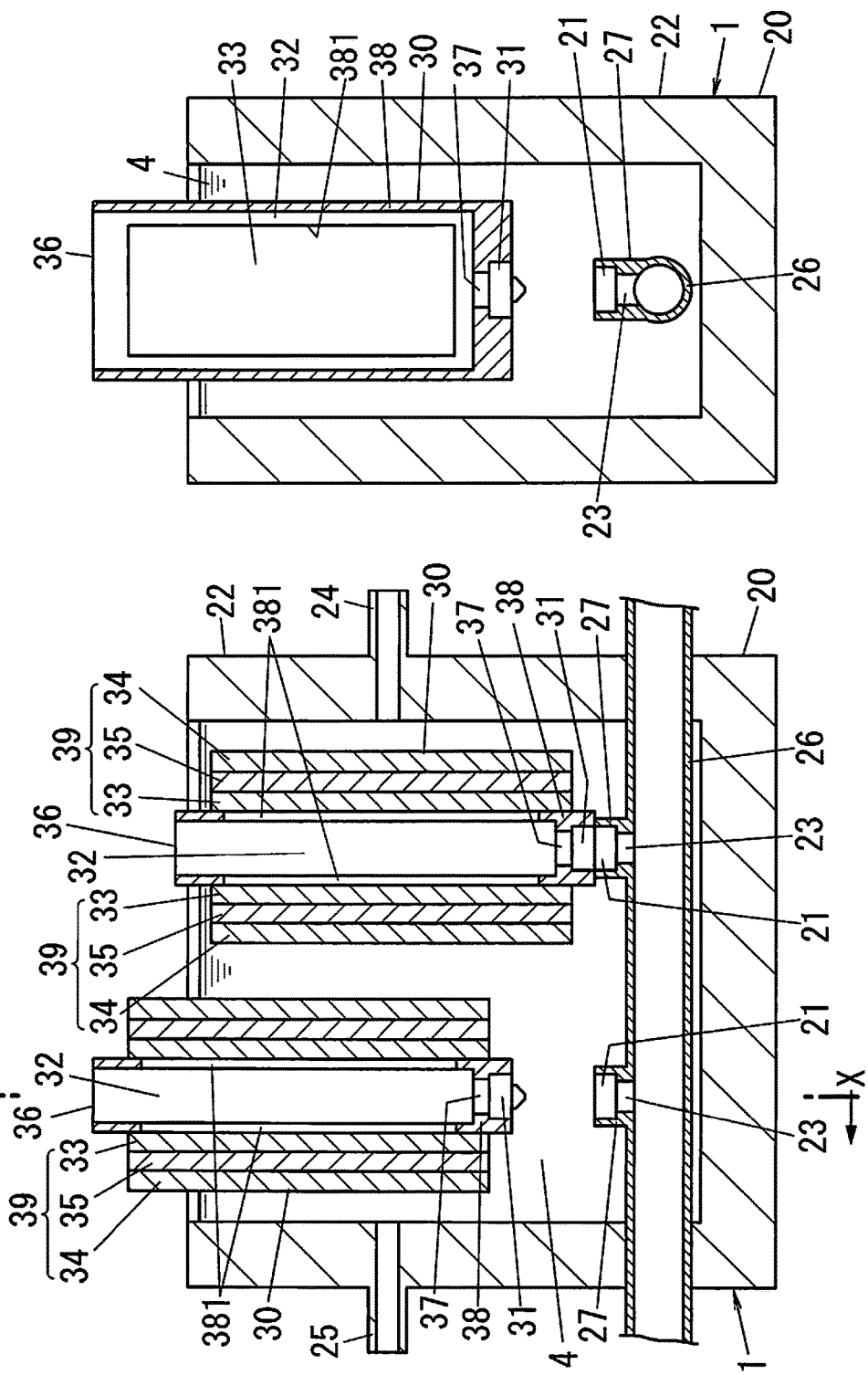

FIG. 3
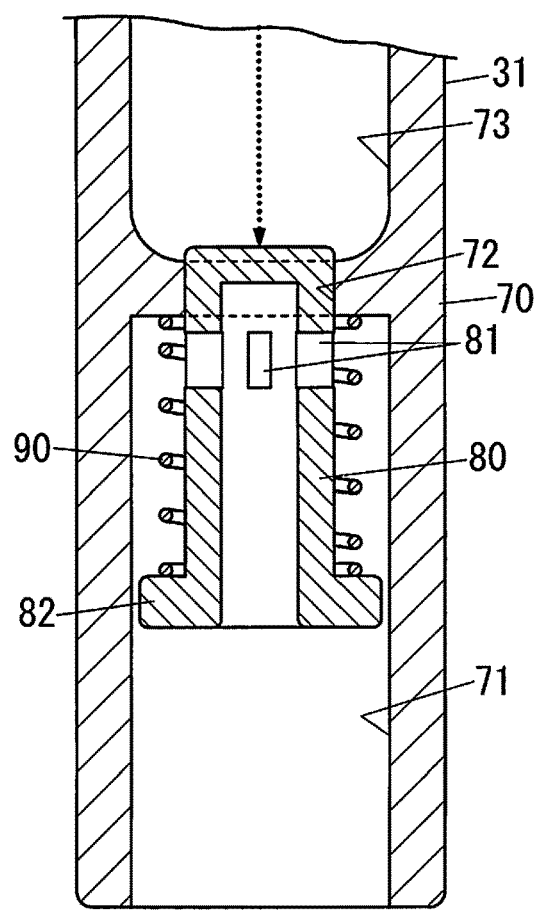
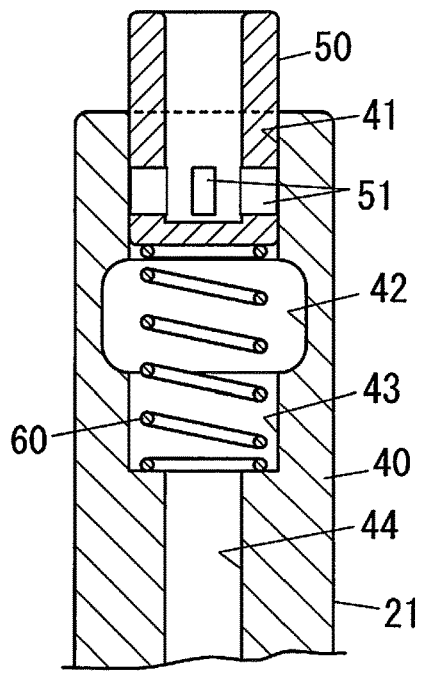

MICROBIAL FUEL CELL

TECHNICAL FIELD

This invention relates generally to microbial fuel cells and, more particularly, to a microbial fuel cell, which includes: a container unit with an electrolytic cell; and an electrode unit with an electrode.

BACKGROUND ART

A microbial fuel cell is a device to convert, into electrical energy, chemical energy of organic matters included in waste water by catalytic action (metabolic reaction or biochemical transformation) of microbes, and further subject the organic matters to oxidative decomposition treatment.

For example, a document "JP 2009-93861 A" discloses a microbial fuel cell configured as follow: a negative electrode, to which anaerobic microbes are adhered, is held in a sealed internal space of an electrolytic cell, while an organic substrate is retained and the negative electrode is immersed; an ion-transfer-layer cassette is inserted in the internal space of this electrolytic cell; at least part of an outer shell of the cassette includes an ion permeable transfer layer; and a positive electrode is enclosed or coupled inside the cassette. In this microbial fuel cell, two kinds of vent pipes are further connected to the ion-transfer-layer cassette: a vent pipe for supplying gas into the ion-transfer-layer cassette; and a vent pipe for exhausting gas from the inside of the ion-transfer-layer cassette. The vent pipes are pulled out of the electrolytic cell from the ion-transfer-layer cassette. Oxygen that is fuel is supplied into the ion-transfer-layer cassette through one of the vent pipes.

However, in case oxidizing gas such as the oxygen is supplied to the microbial fuel cell, a complicated design for piping is needed, when the two kinds of vent pipes, namely, the vent pipe for supplying and the vent pipe for exhausting, are pulled out of the electrolytic cell from the inside thereof, as the technique disclosed in the above document: JP 2009-93861 A. In addition, because the cost required for supplying the oxygen to the microbial fuel cell is high, the restriction on the use is increased. On the other hand, if the oxygen is supplied to the microbial fuel cell by only natural diffusion of air, it is difficult to supply a sufficient amount of the oxygen to the microbial fuel cell, particularly, in case the size of the microbial fuel cell is large.

SUMMARY OF INVENTION

The present invention has been designed in consideration of the circumstances described above, and an object thereof is to provide a microbial fuel cell, which can simplify a piping configuration for supplying oxidizing gas and secure high utilization efficiency of the oxidizing gas.

A microbial fuel cell according to an aspect of the present invention includes a container unit and an electrode unit. The container unit includes: an electrolytic cell; and a communication port that communicates an inside of the electrolytic cell with an outside of the electrolytic cell. The electrode unit comprises: a gas-phase chamber; a positive electrode that is configured to be in contact with gas in the gas-phase chamber; a negative electrode that is configured to hold microbes; an ion transfer layer that is interposed between the positive electrode and the negative electrode, and has ion conductivity; a first vent port that communicates an inside of the gas-phase chamber with an outside of the gas-phase chamber; and a second vent port that is disposed at a position different from a position where the first vent port is disposed, and communicates the inside of the gas-phase chamber with the outside of the gas-phase chamber. The electrode unit is attached to the container unit such that the gas-phase chamber is communicated with the communication port through the second vent port.

BRIEF DESCRIPTION OF THE DRAWINGS

FIG. 1A is a sectional view of a microbial fuel cell according to a first embodiment of the present invention, and FIG. 1B is a sectional view taken along line X-X, of the microbial fuel cell shown in FIG. 1A;

FIG. 2A is a sectional view of a microbial fuel cell according to a second embodiment of the present invention, and FIG. 2B is a sectional view taken along line X-X, of the microbial fuel cell shown in FIG. 2A;

FIG. 3 is a schematic sectional view of one example of a first connector and a second connector.

DESCRIPTION OF EMBODIMENTS

Figure 4:
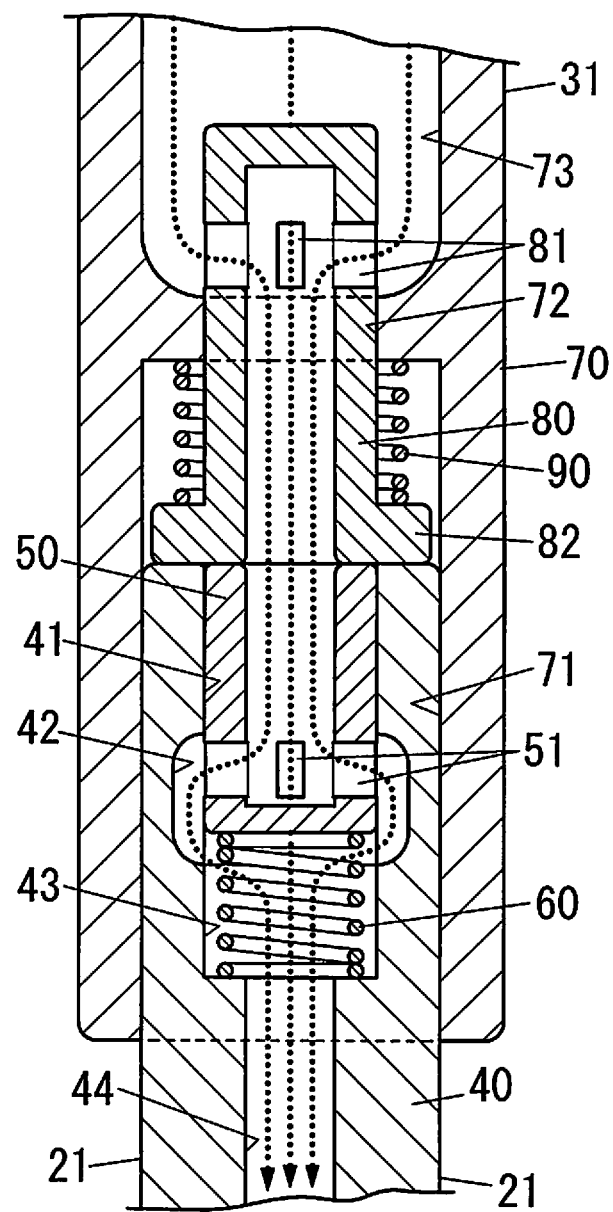
FIG. 4 is a schematic sectional view of the first connector and the second connector, in a state where the second connector in FIG. 3 is attached to the first connector in FIG. 3.

Hereinafter, embodiments of the present invention will be described.

A microbial fuel cell 1 according to a first embodiment shown in FIGS. 1A and 1B and a microbial fuel cell 1 according to a second embodiment shown in FIGS. 2A and 2B each include a container unit 20 and an electrode unit 30. The container unit 20 includes: an electrolytic cell 22; and a communication port 23 that communicates an inside of the electrolytic cell 22 with an outside of the electrolytic cell 22. The electrode unit 30 includes: a positive electrode 33 that is configured to be in contact with gas in a gas-phase chamber 32; a negative electrode 34 that is configured to hold microbes; an ion transfer layer 35 that is interposed between the positive electrode 33 and the negative electrode 34; a first vent port 36 that communicates an inside of the gas-phase chamber 32 with an outside of the gas-phase chamber 32; and a second vent port 37 that is disposed at a position different from a position where the first vent port 36 is disposed, and communicates the inside of the gas-phase chamber 32 with the outside of the gas-phase chamber 32. The positive electrode 33, the negative electrode 34 and the ion transfer layer 35 are disposed in the electrolytic cell 22. The negative electrode 34 is exposed to the outside of the electrode unit 30. The ion transfer layer 35 has ion conductivity. The electrode unit 30 is attached to the container unit 20 such that the gas-phase chamber 32 is communicated with the communication port 23 through the second vent port 37.

Accordingly, in the first embodiment and the second embodiment, oxidizing gas such as oxygen, which is fuel, can be supplied from the outside of the electrolytic cell 22 to the microbial fuel cell 1 through the communication port 23. The oxidizing gas is supplied into the gas-phase chamber 32 through the communication port 23 and the second vent port 37 so as to be utilized for power generation by the microbial fuel cell. The oxidizing gas supplied into the gas-phase chamber 32 is exhausted to the outside of the gas-phase chamber 32 via the first vent port 36 after diffused in the gas-phase chamber 32, and the oxidizing gas can be therefore efficiently utilized for the power generation by the microbial fuel cell. Furthermore, the mechanism for supplying the oxidizing gas, of the microbial fuel cell 1, can be simplified. Alternatively, the oxidizing gas may be supplied into the gas-phase chamber 32 from the outside of the gas-phase chamber 32 via the first vent port 36, and then exhausted to the outside of the gas-phase chamber 32 from the gas-phase chamber 32 via the second vent port 37 and the communication port 23. Also in this case, the oxidizing gas can be efficiently utilized for the power generation by the microbial fuel cell.

Accordingly, the microbial fuel cell 1 can simplify a piping configuration for supplying the oxidizing gas and secure high utilization efficiency of the oxidizing gas.

In the microbial fuel cell 1 according to the first embodiment or second embodiment, the communication port 23 is preferable to be provided with a first connector 21, and the second vent port 37 is preferable to be provided with a second connector 31. The electrode unit 30 is preferable to be configured to be detachably attached to the container unit 20, and the second connector 31 is also preferable to be configured to be detachably attached to the first connector 21. In particular, the second connector 31 is preferable to be in a state of being attached to the first connector 21, while the electrode unit 30 is in a state of being attached to the container unit 20, and the second connector is preferable to be detached from the first connector 21 by detachment of the electrode unit 30 from the container unit 20. In addition, the first connector 21 and the second connector 31 are preferable to include automatic opening/closing valves, respectively. Each automatic opening/closing valve is also preferable to be configured to be opened by attachment of the second connector 31 to the first connector 21, and closed by detachment of the second connector 31 from the first connector 21. In this case, the electrode unit 30 can be detached from the container unit 20 for maintenance of the electrode unit 30. The maintenance of the electrode unit 30 can be therefore facilitated. Furthermore, even when the electrode unit 30 is attached to the container unit 20 or detached from the container unit 20 in a state where electrolytic solution 4 is supported by the electrolytic cell 22, the electrolytic solution 4 can be prevented from entering the gas-phase chamber 32 through the second vent port 37, and the electrolytic solution 4 in the electrolytic cell 22 can be prevented leaking from the communication port 23. In addition, the mechanism for supplying the oxidizing gas to the microbial fuel cell 1 does not obstruct the attachment/detachment of the electrode unit 30. The attachment/detachment of the electrode unit 30 can be therefore facilitated.

Hereinafter, the first embodiment of the present invention will be described in more detail.

FIGS. 1A and 1B show the microbial fuel cell 1 according to the first embodiment. In the first embodiment, the container unit 20 includes the electrolytic cell 22 and the communication port 23, as described above. In the first embodiment, the communication port 23 penetrates the bottom of the electrolytic cell 22 such that the inside of the electrolytic cell 22 is communicated with the outside of the electrolytic cell 22. The communication port 23 is provided therein with the first connector 21. An inflow pipe 24 and an outflow pipe 25 are connected to the electrolytic cell 22 so as to be communicated with the inside of the electrolytic cell 22.

The electrode unit 30 includes the gas-phase chamber 32, the positive electrode 33, the negative electrode 34, the ion transfer layer 35, the first vent port 36 and second vent port 37, as described above.

In the first embodiment, the electrode unit 30 includes a hollow casing 38. A space inside of this casing 38 corresponds to the gas-phase chamber 32. The second vent port 37 penetrates the bottom of the casing 38 such that the outside of the casing 38 is communicated with the gas-phase chamber 32 inside of the casing 38. The first vent port 36 penetrates the top of the casing 38 such that the outside of the casing 38 is communicated with the gas-phase chamber 32 inside of the casing 38. The second vent port 37 is provided therein with the second connector 31.

In the electrode unit 30 of the first embodiment, the positive electrode 33, the ion transfer layer 35 and the negative electrode 34 are stacked in that order. Thus, the positive electrode 33, the ion transfer layer 35 and the negative electrode 34 constitute a membrane electrode assembly 39 (MEA).

Material for the negative electrode 34 is conductive metal such as aluminum, copper, stainless, nickel or titanium, or carbon material such as carbon paper or carbon felt. The negative electrode 34 may have a space (void) that continuously extends in a thickness direction thereof. The negative electrode 34 may be for example a porous electro-conductive sheet or a woven electro-conductive sheet, which has therein voids. Alternatively, the negative electrode 34 may be a metal plate with a plurality of through-holes that penetrates in the thickness direction.

The negative electrode 34 is configured to hold microbes. For example, the microbes are held on a surface, which is on the opposite side from the ion transfer layer 35, of the negative electrode 34. For example, a biofilm that includes the microbes is fixed on the surface of the negative electrode 34, thereby the microbes being held by the negative electrode 34. The biofilm generally means a three-dimensional structure that includes a microbial population and extracellular polymeric substances (EPS) produced by the microbial population. Note that, the microbes may be held by the negative electrode 34 without the biofilm.

The microbes held by the negative electrode 34 are anaerobic microbes, and may be for example electricity producing bacteria that have an extracellular electron transfer mechanism. More specifically, examples of the microbes include *Geobacter* Strains, *Shewanella* Strains, *Aeromonas* Strains, *Geothrix* Strains and *Saccharomyces* Strains.

The negative electrode 34 may hold mediators (also referred to as electron transfer mediator molecules) in addition to the microbes. In this case, the mediators held by the negative electrode 34 mediate transfer of electrons between the microbes and the negative electrode 34, which can improve the transfer efficiency of the electrons from the microbes to the negative electrode 34. The electrolytic solution 4 may hold the mediators instead of the negative electrode 34. Alternatively, in addition to that the negative electrode 34 holds the mediators, the electrolytic solution 4 may also hold mediators. Also in this case, the mediators in the electrolytic solution 4 mediate transfer of electrons between the microbes and the negative electrode 34, which can improve the transfer efficiency of the electrons from the microbes to the negative electrode 34. Examples of the mediators held by the negative electrode 34 and the mediators included in the electrolytic solution 4 include Neutral Red (3-Amino-7-dimethylamino-2-methylphenazinium Chloride), Anthraquinone-2,6-disulfonic acid disodium (AQDS), Thionin, Potassium ferricyanide, and Methyl viologen.

The ion transfer layer 35 has ion conductivity. The ion transfer layer 35 is formed of an ion exchange membrane, a solid electrolyte membrane, a glass fiber membrane or a synthetic fiber membrane, for example. That is, the ion transfer layer 35 is a member such as the ion exchange membrane or the solid electrolyte membrane, which itself has the ion conductivity. Alternatively, the ion transfer layer 35 may be a member obtained by impregnating a porous membrane such as the glass fiber membrane or the synthetic fiber membrane, which itself does not have the ion conductivity, with electrolytic solution in order to provide the ion conductivity to it. The ion transfer layer 35 may be formed of an appropriate ion exchange membrane that has proton conductivity, for example. Examples of the ion transfer layer 35 include fluororesin-based ion exchange membranes, such as Nafion (made by DuPont; a registered trade mark) and Flemion (made by Asahi Glass Co., Ltd; a registered trade mark), which have the proton conductivity.

The positive electrode 33 is a gas diffusion electrode, for example. The gas diffusion electrode includes a water-repellent layer and a gas diffusion layer, for example. The water-repellent layer is disposed between the gas diffusion layer and the ion transfer layer 35.

The water-repellent layer is a layer with both of water repellency and gas permeability. The water-repellent layer is configured to permit movement of gas from a gas phase to a liquid phase, while excellently separating the gas phase from the liquid phase in an electrochemical system of the microbial fuel cell 1. The water-repellent layer is preferable to be porous. In this case, the water-repellent layer can have high gas permeability. The water-repellent layer is made of one or more kinds of materials, selected from a group of polytetrafluoroethylene (PTFE), polydimethylsiloxane (PDMS), polyethylene (PE) and polypropylene (PP), for example.

The gas diffusion layer includes, for example, an electro-conductive material that is porous and a catalyst that is being carried by this electro-conductive material. Alternatively, the gas diffusion layer may be formed of a catalyst that is porous and has electro-conductivity.

The electro-conductive material of the gas diffusion layer is made of one or more kinds of materials, selected from a group of a carbon-based substance, a conductive polymer, a semiconductor and a metal, for example. The carbon-based substance means a substance that has carbon as a constituent. Examples of the carbon-based substance include graphite, activated carbon, carbon powder, carbon plate, carbon paper and carbon disc. Examples of the carbon powder include Carbon black, Vulcan XC-72R, Acetylene black, Furnace black and Denka black. Examples of the carbon fiber include graphite felt, carbon wool and carbon woven. Examples of the carbon-based substances further include a microstructure substance such as a carbon nanotube, a carbon nanohorn and a carbon nanocluster. Examples of the metal include aluminum, copper, stainless, nickel and titanium.

The catalyst of the gas diffusion layer is a precious metal catalyst such as platinum or platinum alloy.

The catalyst of the gas diffusion layer is also preferable to be a carbon-based material doped with metal atoms. The metal atoms are not limited in particular, but preferable to be one or more kinds of metal atoms, selected from Ti, V, Cr, Mn, Fe, Co, Ni, Cu, Zr, Nb, Mo, Ru, Rh, Pd, Ag, Hf, Ta, W, Re, Os, Ir, Pt and Au. In this case, the carbon-based material has excellent performance, as a catalyst for accelerating oxygen reduction reaction and oxygen generation reaction in particular. The amounts of the one or more kinds of metal atoms in the carbon-based material may be appropriately set such that the carbon-based material has excellent catalyst performance.

The carbon-based material is preferable to be further doped with one or more kinds of nonmetal atoms, selected from nitrogen atoms, boron atoms, sulfur atoms and phosphorus atoms. The amounts of the one or more kinds of nonmetal atoms with which the carbon-based material is doped may be also appropriately set such that the carbon-based material has excellent catalyst performance.

The carbon-based material can be obtained by using a carbon source material such as graphite or amorphous carbon, as a base, and doping this carbon source material with: the one or more kinds of metal atoms; and the one or more kinds of nonmetal atoms selected from the nitrogen atoms, the boron atoms, the sulfur atoms and the phosphorus atoms.

The positive electrode 33 is configured to be in contact with gas in the gas-phase chamber 32, as described above. In other words, the positive electrode 33 is configured such that molecules of the oxidizing gas in the gas-phase chamber 32 reach the positive electrode 33 and are reduced by the electrochemical reaction. For this, the positive electrode 33 is, for example, exposed to the gas-phase chamber 32. In the first embodiment, the positive electrode 33 is disposed on a lateral wall that separates the gas-phase chamber 32 inside the casing 38 from the outside of the casing 38. The lateral wall has an opening 381, and the positive electrode 33 is exposed to the gas-phase chamber 32 through this opening 381. Thus, the positive electrode 33 is configured to be in contact with gas in the gas-phase chamber 32.

The configuration of the positive electrode 33 is not limited to the first embodiment, as long as the molecules of the oxidizing gas in the gas-phase chamber 32 can reach the positive electrode 33 and be reduced by the electrochemical reaction.

In the first embodiment, the single electrode unit 30 includes two membrane electrode assemblies 39. The casing 38 is disposed between the two membrane electrode assemblies 39, and the respective positive electrodes 33 of the two membrane electrode assemblies 39 are configured to be in contact with gas in the gas-phase chamber 32 of the casing 38. Of course, alternatively the single electrode unit 30 may include a single membrane electrode assembly 39.

The second connector 31 is configured to be detachably attached to the first connector 21. As described above, the first connector 21 and the second connector 31 are preferable to include automatic opening/closing valves, respectively. Each automatic opening/closing valve is also preferable to be configured to be opened by attachment of the second connector 31 to the first connector 21, and closed by detachment of the second connector 31 from the first connector 21. As the first connector 21 and the second connector 31, well-known connectors with automatic opening/closing valves, such as Product Name: CPC Coupling (made by SANWA Enterprise Company), can be applied. In this case, when the second connector 31 is attached to the first connector 21, the automatic opening/closing valves of the second connector 31 and the first connector 21 are opened, and the second vent port 37 is accordingly communicated with the communication port 23. The gas-phase chamber 32 is therefore communicated with the communication port 23 via the second vent port 37.

FIGS. 3 and 4 each show a schematic view of specific exemplary configurations of the first connector 21 and the second connector 31.

The first connector 21 and the second connector 31 shown in FIG. 3 are in closed states.

As shown in FIG. 3, the first connector 21 includes: a housing 40 that has a tubular shape; and an internal unit 50 that is being inserted into the housing 40. A hollow portion inside of the housing 40 includes: a holding portion 41 that has an inner diameter equal to an outer diameter of the internal unit 50; a passage portion 42 that has an inner diameter larger than that of the holding portion 41; a first connecting portion 43 that has an inner diameter smaller than that of the passage portion 42; and a second connecting portion 44 that has an inner diameter smaller than that of the first connecting portion 43, and those are arranged in that order from an end side of the housing 40. The second connecting portion 44 is communicated with the communication port 23. The internal unit 50 is a tubular-shaped member having an end that is opened and a rear end that is closed. The internal unit 50 is disposed in the holding portion 41, while the end part of the internal unit 50 projects outward from an opening formed in the end of the housing 40. The internal unit 50 is provided in a lateral surface thereof with a passage port 51 that communicates the inside of the internal unit 50 with the outside of the internal unit 50. The passage port 51 is being closed by an inner peripheral surface of the holding portion 41. For this reason, the inside of the internal unit 50 is not communicated with the second connecting portion 44, and the first connector 21 shown in FIG. 3 is in the closed state. The housing 40 is provided therein with a coil spring 60. One end of the coil spring 60 is fixed to a stepped part between the first connecting portion 43 and the second connecting portion 44, and the other end of the coil spring 60 is fixed to a bottom surface of the internal unit 50.

As shown in FIG. 3, the second connector 31 includes: a housing 70 that has a tubular shape; and an internal unit 80 that is being inserted into the housing 70. A hollow portion inside of the housing 70 includes: an inserted portion 71 that has an inner diameter equal to an outer diameter of the housing 40 of the first connector 21; a holding portion 72 that has an inner diameter equal to an outer diameter of the internal unit 80; and a connecting portion 73 that has an inner diameter larger than that of the holding portion 72, and those are arranged in that order from an end side of the housing 70. The connecting portion 73 is communicated with the second vent port 37. The internal unit 80 is a tubular-shaped member having an end that is opened and a rear end that is closed. The rear end part of the internal unit 80 is inserted to the holding portion 72, while the end part of the internal unit 80 is disposed in the inserted portion 71. The internal unit 80 is provided in a lateral surface thereof with a passage port 81 that communicates the inside of the internal unit 80 with the outside of the internal unit 80. The passage port 81 is disposed in the inserted portion 71. For this reason, the inside of the internal unit 80 is not communicated with the connecting portion 73, and the second connector 31 shown in FIG. 3 is in the closed state. The internal unit 80 is provided at an outer periphery of an end part thereof with a rib 82. The housing 70 is provided therein with a coil spring 90. One end of the coil spring 90 is fixed to a stepped part between the inserted portion 71 and the holding portion 72, and the other end of the coil spring 90 is fixed to the rib 82 of the internal unit 80.

The internal unit 50 of the first connector 21 functions as an automatic opening/closing valve, and the internal unit 80 of the second connector 31 also functions as an automatic opening/closing valve.

In case the second connector 31 is attached to the first connector 21, the housing 40 of the first connector 21 is inserted into the inserted portion 71 of the second connector 31, and the internal unit 50 of the first connector 21 and the internal unit 80 of the second connector 31 are accordingly butted to each other. The inside of the internal unit 50 is therefore communicated with the inside of the internal unit 80. When the second connector 31 is further pushed to the first connector 21, the internal unit 50 of the first connector 21 is set back against the elastic force of the coil spring 60, and also the internal unit 80 of the second connector 31 is set back against the elastic force of the coil spring 90. As shown in FIG. 4, the passage port 51 is moved into the passage portion 42 by the setback of the internal unit 50 of the first connector 21, and accordingly opened. Thus, the inside of the internal unit 50 is communicated with the second connecting portion 44 through the passage port 51, the passage portion 42 and the first connecting portion 43, and the first connector 21 becomes the opened state. Also shown in FIG. 4, the passage port 81 is moved into the connecting portion 73 by the setback of the internal unit 80 of the second connector 31, and accordingly opened. Thus, the inside of the internal unit 80 is communicated with the connecting portion 73 through the passage port 81, and the second connector 31 also becomes the opened state. In this way, both of the first connector 21 and the second connector 31 are changed to the opened states by the attachment of the second connector 31 to the first connector 21. Accordingly, as shown by arrows in FIG. 4, the gas is permitted to pass between the first connector 21 and the second connector 31. When the second connector 31 is detached from the first connector 21, both of the first connector 21 and the second connector 31 are returned to the closed states shown in FIG. 3.

The electrode unit 30 is disposed inside of the electrolytic cell 22 of the container unit 20 and further the second connector 31 is attached to the first connector 21, thereby the electrode unit 30 being attached to the container unit 20. In this state, the positive electrode 33, the negative electrode 34 and the ion transfer layer 35 are disposed inside of the electrolytic cell 22. The first vent port 36 is disposed above the electrolytic cell 22. For this reason, the first vent port 36 is disposed outside of the electrolytic cell 22. Furthermore, the gas-phase chamber 32 is communicated with the communication port 23 via the second vent port 37.

In the first embodiment, the electrode unit 30 may be fixed to the container unit 20 by attachment of the second connector 31 to the first connector 21. That is, the first connector 21 may fix the electrode unit 30 to the container unit 20. In case the electrode unit 30 is fixed to the container unit 20 by the attachment of the second connector 31 to the first connector 21, it is possible to suppress the electrode unit 30 from floating up by buoyant force. To fix the electrode unit 30 to the container unit 20, an appropriate structure other than the first connector 21 may be provided.

The single microbial fuel cell 1 may include two or more electrode units 30. In the first embodiment, the microbial fuel cell 1 includes: a single container unit 20; and two electrode units 30 that are configured to be detachably attached to this container unit 20. The container unit 20 includes two communication ports 23 and two first connectors 21 that correspond to the two electrode units 30.

In case the microbial fuel cell 1 is operated, for example, the electrolytic solution 4 is first supplied to the inside of the electrolytic cell 22 so as to be supported by the electrolytic cell 22, in a state where the electrode unit 30 is attached to the container unit 20. The electrolytic solution 4 is supplied to the inside of the electrolytic cell 22 via the inflow pipe 24, for example. The negative electrode 34 is in contact with the electrolytic solution 4 in the electrolytic cell 22, when the electrolytic solution 4 is supported by the electrolytic cell 22.

The electrolytic solution 4 includes organic matters. The electrolytic solution 4 further includes electrolytes, such as $KH_2PO_4$, $K_2HPO_4$, $(NH_4)_2SO_4$, $MgSO_4.7H_2O$, NaCl, $CaCl_2.2H_2O$, $Na_2S_2O_3.5H_2O$ or the like. For example, the electrolytic solution 4 may be prepared by adding the electrolytes to waste water including the organic matters if necessary.

The oxidizing gas is supplied into the gas-phase chamber 32 from the outside of the electrolytic cell 22 through the communication port 23 and the second vent port 37. Examples of the oxidizing gas include oxygen gas. For example, when a piping is connected to the communication port 23 and the oxidizing gas is supplied to this piping by a pump or the like, the oxidizing gas is supplied into the gas-phase chamber 32 through the piping, the communication port 23 and the second vent port 37, while the gas in the gas-phase chamber 32 is exhausted to the outside through the first vent port 36.

The positive electrode 33 and the negative electrode 34 are connected to an external circuit.

When the microbial fuel cell 1 is operated in this way, the organic matters in the electrolytic solution 4 are decomposed by metabolism of the microbes on the negative electrode 34, and electrons, protons and carbon dioxide are therefore generated. The electrons move from the negative electrode 34 to the external circuit, and the protons reach the positive electrode 33 after passing through the ion transfer layer 35. On the positive electrode 33, the oxidizing gas from the gas-phase chamber 32 reacts with protons and electrons, and is accordingly reduced. Therefore, water is generated if the oxidizing gas is oxygen gas. By such the electrochemical reaction, the electromotive force is generated between the positive electrode 33 and the negative electrode 34, and the organic matters in the electrolytic solution 4 are decomposed. Thus, it is possible to realize the power generation and perform the decomposition treatment for the organic matters in the electrolytic solution 4.

After subjected to the treatment, the electrolytic solution 4 is exhausted to the outside of the electrolytic cell 22 through the outflow pipe 25. While the microbial fuel cell 1 is operated, the electrolytic solution 4 may be continuously supplied to the electrolytic cell 22 through the inflow pipe 24, and the electrolytic solution 4 inside of the electrolytic cell 22 may be also continuously exhausted through the outflow pipe 25.

In the first embodiment, when supplied into the gas-phase chamber 32 through the second vent port 37, the oxidizing gas diffuses upward in the gas-phase chamber 32, and is exhausted to the outside from the first vent port 36 after reaching the top end of the gas-phase chamber 32. For this reason, the oxidizing gas efficiently spreads over the entire gas-phase chamber 32, and the gas is suppressed from staying in the gas-phase chamber 32. Accordingly, the oxidizing gas can be efficiently utilized for the electrochemical reaction in the microbial fuel cell 1, and the power generation efficiency of the microbial fuel cell 1 can be improved.

Alternatively, in the first embodiment, the oxidizing gas may be supplied into the gas-phase chamber 32 through the first vent port 36, and the gas in the gas-phase chamber 32 may be exhausted to the outside through the second vent port 37 and the communication port 23. The oxidizing gas may be sent to the first vent port 36 by a pump, a blower or the like so as to be supplied into the gas-phase chamber 32 through the first vent port 36. A piping may be connected to the communication port 23, and a negative pressure may be applied to this piping by a vacuum pump or the like, and the gas in the gas-phase chamber 32 may be therefore sucked through the second vent port 37 and the communication port 23, and the oxidizing gas may be accordingly made to enter the gas-phase chamber 32 through the first vent port 36. Also in this case, the oxidizing gas efficiently spreads over the entire gas-phase chamber 32, and the gas is suppressed from staying in the gas-phase chamber 32.

In case maintenance, replacement or the like of the electrode unit 30 is performed, the electrode unit 30 can be detached from the container unit 20 by detachment of the second connector 31 from the first connector 21. In this case, since the first connector 21 and the second connector 31 include the automatic opening/closing valves, respectively, the automatic opening/closing valves are closed by the detachment of the second connector 31 from the first connector 21. As a result, even while the electrolytic cell 22 supports the electrolytic solution 4, the electrolytic solution 4 is prevented from entering the gas-phase chamber 32 via the second vent port 37 and also from leaking from the electrolytic cell 22 via the communication port 23. In case the electrode unit 30 is attached to the container unit 20, even while the electrolytic cell 22 supports the electrolytic solution 4, the attachment of the electrode unit 30 to the container unit 20 can be easily performed.

FIGS. 2A and 2B show a microbial fuel cell 1 according to the second embodiment. The microbial fuel cell 1 according to the second embodiment also includes an electrode unit 30 and a container unit 20, similarly to the case of the first embodiment. The electrode unit 30 has the same configuration as the case of the first embodiment.

The container unit 20 according to the second embodiment includes: an electrolytic cell 22; and a communication port 23 that communicates an inside of the electrolytic cell 22 with an outside of the electrolytic cell 22, and further includes a gas passage pipe 26. The gas passage pipe 26 is arranged such that a longitudinal direction thereof is in parallel with the horizontal direction. The gas passage pipe 26 penetrates the electrolytic cell 22.

In the second embodiment, the communication port 23 communicates the inside of the electrolytic cell 22 with the gas passage pipe 26. The communication port 23 is provided at an end portion of a branch pipe 27 that projects upward from an outer periphery surface of the gas passage pipe 26. The communication port 23 is opened upward. Thus, the communication port 23 communicates the inside of the electrolytic cell 22 with the outside of the electrolytic cell 22 through the gas passage pipe 26. The communication port 23 is provided therein with a first connector 21, similarly to the case of the first embodiment.

In the second embodiment, the electrode unit 30 is disposed inside of the electrolytic cell 22 of the container unit 20 and further a second connector 31 is attached to the first connector 21, thereby the electrode unit 30 being attached to the container unit 20, similarly to the first embodiment. In this state, a positive electrode 33, a negative electrode 34 and an ion transfer layer 35 are disposed inside of the electrolytic cell 22. A first vent port 36 is disposed above the electrolytic cell 22. For this reason, the first vent port 36 is disposed outside of the electrolytic cell 22.

Furthermore, a gas-phase chamber 32 is communicated with the communication port 23 via a second vent port 37. Therefore, the gas-phase chamber 32 is communicated with the gas passage pipe 26 via the second vent port 37 and the communication port 23.

In case the microbial fuel cell 1 according to the second embodiment is operated, for example, electrolytic solution 4 is first supplied to the inside of the electrolytic cell 22 so as to be supported by the electrolytic cell 22, in a state where the electrode unit 30 is attached to the container unit 20.

The oxidizing gas is supplied to the gas passage pipe 26 by a pump or the like. The oxidizing gas is accordingly supplied into the gas-phase chamber 32 through the gas passage pipe 26, the communication port 23 and the second vent port 37, while the gas in the gas-phase chamber 32 is exhausted to the outside through the first vent port 36.

Alternatively, also in the second embodiment, the oxidizing gas may be supplied into the gas-phase chamber 32 through the first vent port 36, and the gas in the gas-phase chamber 32 may be exhausted to the outside through the second vent port 37, the communication port 23 and the gas passage pipe 26. The oxidizing gas may be sent from the outside to the first vent port 36 by a pump, a blower or the like so as to be supplied into the gas-phase chamber 32 through the first vent port 36. A negative pressure may be applied to the gas passage pipe 26 by a vacuum pump or the like, and the gas in the gas-phase chamber 32 may be therefore sucked through the second vent port 37 and the communication port 23, and the oxidizing gas may be accordingly made to enter the gas-phase chamber 32 through the first vent port 36.

The positive electrode 33 and the negative electrode 34 are connected to an external circuit.

When the microbial fuel cell 1 is operated in this way, it is possible to realize the power generation and perform the decomposition treatment for the organic matters in the electrolytic solution 4, similarly to the case of the first embodiment.

After subjected to the treatment, the electrolytic solution 4 is exhausted to the outside of the electrolytic cell 22 through the outflow pipe 25. While the microbial fuel cell 1 is operated, the electrolytic solution 4 may be continuously supplied to the electrolytic cell 22 through the inflow pipe 24, and the electrolytic solution 4 inside of the electrolytic cell 22 may be also continuously exhausted through the outflow pipe 25.

Also in the second embodiment, the oxidizing gas can be efficiently utilized for the electrochemical reaction in the microbial fuel cell 1, and the power generation efficiency of the microbial fuel cell 1 can be improved, similarly to the first embodiment. Furthermore also in the second embodiment, in case the electrode unit 30 is detached from the container unit 20 by the detachment of the second connector 31 from the first connector 21, since the first connector 21 and the second connector 31 include the automatic opening/closing valves, respectively, the electrolytic solution 4 is prevented from entering the gas-phase chamber 32 via the second vent port 37 and also from leaking from the electrolytic cell 22 via the communication port 23, even while the electrolytic solution 4 is supported inside of the electrolytic cell 22. In case the electrode unit 30 is attached to the container unit 20, the attachment of the electrode unit 30 to the container unit 20 can be easily performed, even while the electrolytic solution 4 is supported inside of the electrolytic cell 22.

Note that, the embodiments described above are examples of the present invention. For this reason, the present invention is not limited to the embodiments described above, and various modifications can be made according to the design or the like even in a case other than the embodiments, as long as they do not depart from the technical ideas of the present invention.

The invention claimed is:

1. A microbial fuel cell, comprising a container unit and an electrode unit,
    the container unit comprising:
        an electrolytic cell; and
        a communication port that communicates an inside of the electrolytic cell with an outside of the electrolytic cell,
    the electrode unit comprising:
        a gas-phase chamber;
        a positive electrode that is configured to be in contact with gas in the gas-phase chamber;
        a negative electrode that is configured to hold microbes;
        an ion transfer layer that is interposed between the positive electrode and the negative electrode, and has ion conductivity;
        a first vent port that communicates an inside of the gas-phase chamber with an outside of the gas-phase chamber; and
        a second vent port that is disposed at a position different from a position where the first vent port is disposed, and communicates the inside of the gas-phase chamber with the outside of the gas-phase chamber, and
    the electrode unit being attached to the container unit such that the gas-phase chamber is communicated with the communication port through the second vent port.

2. The microbial fuel cell according to claim 1, wherein:
    the electrode unit is configured to be detachably attached to the container unit;
    the communication port is provided with a first connector, and the second vent port is provided with a second connector; and
    the second connector is configured to be detachably attached to the first connector, the second connector being in a state of being attached to the first connector, while the electrode unit is in a state of being attached to the container unit, and the second connector being detached from the first connector by detachment of the electrode unit from the container unit.

3. The microbial fuel cell according to claim 2, wherein the first connector and the second connector include automatic opening/closing valves, respectively, each automatic opening/closing valve being configured to be opened by attachment of the second connector to the first connector, and closed by detachment of the second connector from the first connector.

* * * * *